United States Patent
Lilie et al.

(10) Patent No.: US 6,884,044 B2
(45) Date of Patent: Apr. 26, 2005

(54) LINEAR COMPRESSOR

(75) Inventors: Dietmar Erich Bernhard Lilie, Joinville (BR); Rinaldo Puff, Joinville (BR)

(73) Assignee: Empresa Brasileira de Compressores S.A.-Embraco

(*) Notice: Subject to any disclaimer, the term of this patent is extended or adjusted under 35 U.S.C. 154(b) by 0 days.

(21) Appl. No.: 10/476,276

(22) PCT Filed: Apr. 23, 2002

(86) PCT No.: PCT/BR02/00055
§ 371 (c)(1),
(2), (4) Date: Oct. 22, 2003

(87) PCT Pub. No.: WO02/086321
PCT Pub. Date: Oct. 31, 2002

(65) Prior Publication Data
US 2004/0156730 A1 Aug. 12, 2004

(30) Foreign Application Priority Data
Apr. 23, 2001 (BR) ............................................ 0101879

(51) Int. Cl.⁷ ................................................ F04B 17/04
(52) U.S. Cl. ...................................... 417/363; 417/417
(58) Field of Search ................................ 417/363, 415, 417/417

(56) References Cited

U.S. PATENT DOCUMENTS

| 3,788,778 A | * | 1/1974 | Miller ........................ 417/363 |
| 5,772,410 A | | 6/1998 | Chang |
| 5,993,178 A | | 11/1999 | Park et al. |
| 6,273,688 B1 | * | 8/2001 | Kawahara et al. .......... 417/417 |

FOREIGN PATENT DOCUMENTS

| EP | 0 994 253 A2 | 4/2000 |
| GB | 1 222 425 A1 | 2/1971 |
| WO | WO-02/06698 A1 | 1/2002 |

* cited by examiner

Primary Examiner—Michael Koczo
(74) Attorney, Agent, or Firm—Darby & Darby

(57) ABSTRACT

A linear compressor vertically mounted inside a hermetic shell (8) and including: a reference assembly with elements including a block defining a cylinder (2); a resonant assembly with elements including an actuator (4) that carries a piston (1) within the cylinder (2). There are provided: a first resilient element (20) mounted between the resonant assembly (1,4,5) and one end of the shell (8); a second resilient element (21) mounted between the reference assembly (2) and the other end of the shell (8); and a third resilient element (22) mounted between the reference assembly (2) and the resonant assembly (4), with the first and the second resilient elements (20,21) applying opposite forces to the shell (8) upon reciprocation of the piston (1).

6 Claims, 2 Drawing Sheets

LINEAR COMPRESSOR

This application is the 371 National Phase of International Application No. PCT/BR02/00055, filed Apr. 23, 2002, which was published in English under PCT Article 21(2) as International Publication No. WO 02/086321 A1,which claims priority of Brazilian Application No. PI0101879-5, filed Apr. 23, 2001.

FIELD OF THE INVENTION

The invention relates to a linear compressor and, more particularly, to a mounting arrangement for a linear compressor of the type generally used in small refrigeration systems for distributing the forces transmitted by the compressor components to the hermetic shell, inside which the compressor is mounted.

BACKGROUND OF THE INVENTION

Linear motors are well known devices, in which one of a coil or a magnet element is mounted to a fixed member and the other element to a member to be moved. An electric current is applied to the coil, which generates magnetic lines of force to interact with the magnet to produce linear motion of the movable member. Such linear motors are generally used in refrigeration compressors, in which the movable member is defined by the piston of the compressor, and the magnet is mounted to said piston. The coil is fixedly mounted to an external portion of the compressor structure that forms the cylinder within which the piston is reciprocated.

In a linear compressor of one known type, such as shown in FIG. 1, the compression of the gas results from the axial movement of a piston 1 inside a cylinder 2 that has an external block 2a with a vertical wall 2b. The cylinder is closed by a cylinder head 3 on which is mounted a valve plate 3d on which are positioned a suction valve 3a and a discharge valve 3b. The suction and discharge valves regulate the inlet and outlet of the gas compressed in the cylinder 2. All of these elements are provided within a hermetic shell 8, which typically is of cylindrical shape. There is an inlet conduit 31 forming a passage through the shell 8 for the low pressure gas directed to the suction valve 3a, and an outlet conduit 32 forming a passage through the shell 8 for the compressed gas coming from the discharge valve 3b and which is directed to the outside of the shell 8.

The piston 1 is driven by a linear electric motor formed by a ring shaped actuator 4 that is attached to a base flange 1a of the piston 1. The upper end of the actuator 4 supports a magnet member 5, of toroidal shape and usually formed of a plurality of permanent magnets. A coil 6 of toroidal shape and made of wire is fixedly mounted to the inner lamination 6a of a lamination stack of the stator of the linear motor. Electrical current is supplied to the coil 6 to produce magnetic lines of force to interact with the magnet member 5 and produce linear reciprocating motion of the actuator 4 and the piston 1, with the magnet member 5 moving between the coil 6 and an external lamination 6b of the lamination stack of the stator of the linear motor.

The piston 1 has its base flange 1a incorporating an axial projection 1b connected to the center of a set of flat springs 7, and the edges of the set of springs 7 are rigidly mounted by suitable connectors 10 to the vertical wall 2b of the cylinder. The flat springs 7 are made of sheet steel and move up and down as the piston 1 moves in a linear reciprocation as driven by the linear motor.

The piston 1, the actuator 4, the magnet member 5 and the set of flat springs 7 form together a resonant, or movable, assembly of the compressor. That is, said assembly moves relative to the cylinder 2. The cylinder 2, the cylinder block 2a and the elements affixed to it, such as the head 3, are stationary. These elements are hereafter referred to as the reference, or stationary, assembly.

The elements of the reference assembly carry the elements of the resonant assembly, so that the compressor can be mounted to the shell. As illustrated, all of the operating elements of the compressor are mounted to the bottom wall of the shell 8 by a plurality of resilient suspension elements, shown in the form of springs 9 of the helical type. There can be as many of the springs 9 as needed and these are adequately dimensioned in relation to the weight, or mass, of the various compressor elements and the forces that these elements generate. The springs 9 may be of any suitable shape to absorb the forces as the compressor operates with the piston reciprocating. As can be seen in the compressor shown in FIG. 1, all of the forces produced during operation are largely transmitted to one end of the shell to which the springs 9 are mounted.

FIG. 2 is a schematic diagram of the elements of the compressor of FIG. 1. The elements are designated by:
Ma=mass of the resonant assembly (elements 1, 4, 5, 7)
Mb=mass of the reference assembly (elements 2, 2a, 2b, 3)
Kr=spring constant of the set of flat springs (7) of the resonant assembly
Ks=spring constant of the set of suspension springs (9)

In the compressor of FIG. 1, the suspension springs 9 that mount the complete assembly of compressor elements to the shell 8 have the spring constant Ks. The function of the suspension springs 9 is to minimize the transmission of vibration from the compressor itself (the moving piston acting as a compression pump) to the hermetic shell 8. The spring constant Kr of the set of springs 7 is related to the compression ratio of the compressor. The spring constant Ks of the set of suspension springs 9 usually is many times smaller than that of the spring constant Kr of the set of flat springs 7, in order to have no influence in the mechanical resonance frequency of the masses Ma and Mb of the compressor elements.

During operation of the compressor, the assembly of resonant elements having the mass Ma is displaced by the linear motor in relation to the assembly of reference elements having mass Mb. Due to the principle of action/reaction, the reference assembly will have a displacement on the set of suspension springs 9 that is proportional to the ratio of the masses Ma and Mb of the resonant and reference assemblies. The displacement of the reference assembly, supported by the suspension springs 9, transmits a force to the shell 8 of the compressor as the resonant assembly reciprocates, causing the shell 8 to vibrate. Such vibration is undesirable for this type of compressor, especially when used in residential refrigeration systems. Accordingly, it would be desirable to provide a mounting arrangement for such a linear compressor that reduces the amount of vibration and which is simple and inexpensive in construction and assembly.

OBJECTS OF THE INVENTION

It is an object of the invention to provide a linear compressor inside a hermetic shell having a resilient mounting arrangement to distribute forces to opposite ends of the shell as the compressor operates, in order to reduce overall vibration of the compressor.

A further object of the present invention is to provide a linear compressor in which a compressor is mounted inside a shell, with a spring between each end of the compressor and a corresponding end of the shell, and a spring between the reference assembly of the compressor elements and the resonant assembly of elements of the compressor.

Yet another object of the invention is to provide a linear compressor mounted vertically in a shell having a spring at each of its upper and lower ends engaging opposite ends of the shell, and a spring acting between the fixed and movable elements of the compressor, in order to reduce the vibrations transmitted to the shell.

SUMMARY OF THE INVENTION

In accordance with the invention, a linear compressor has a hermetic shell inside which the compressor elements are mounted. The compressor has a reference, or stationary, assembly of elements including a block forming a cylinder. There is also a resonant, or movable, assembly of elements including an actuator driven by a linear motor that reciprocates a piston within the cylinder. The actuator carries the permanent magnets of the linear motor. A first resilient element, such as a helical spring, is mounted between a part, such as the actuator, of the resonant assembly at one end of the compressor and one end of the shell. A second resilient element, which also can be a helical spring, is mounted between a part of the reference assembly, such as the cylinder block, at the other end of the compressor and the other end of the shell. A third resilient element, also preferably a helical spring, is mounted between the reference assembly and the resonant assembly. In a preferred embodiment, the mounting of the third element is accomplished by engaging one end of the third resilient element with one end of the cylinder, and the other end of said resilient element to the actuator.

As the piston is driven by the linear motor in a reciprocating movement within the cylinder, forces are generated, to which the first and second resilient elements react oppositely. In other words, when one resilient element at one end of the shell is being compressed, the resilient element at the other end is also being compressed. Thus, the forces produced during operation are simultaneously transmitted to both ends of the shell in opposite directions.

The reference assembly has a mass, Mb, the resonant assembly has a mass Ma, and the first and second resilient elements respectively have spring constants Ka and Kb selected so that Ma/Mb=Kb/Ka. The spring constant Kc of the third resilient element is selected to null out, or at least reduce, vibrations in the system.

BRIEF DESCRIPTION OF THE DRAWINGS

Other objects and advantages of the present invention will become more apparent upon reference to the following specification and annexed drawings, in which.

DETAILED DESCRIPTION OF THE INVENTION

Figure 1:
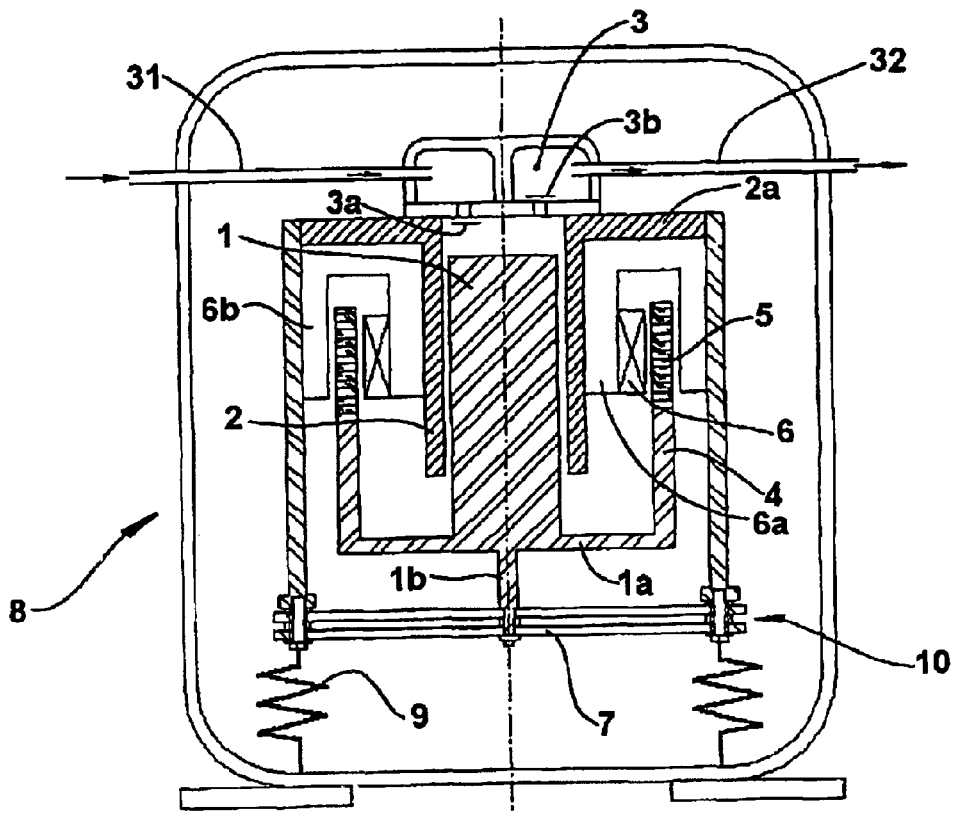
FIG. 1 is an elevational view in cross-section of one type of linear compressor of the prior art.
Figure 2:
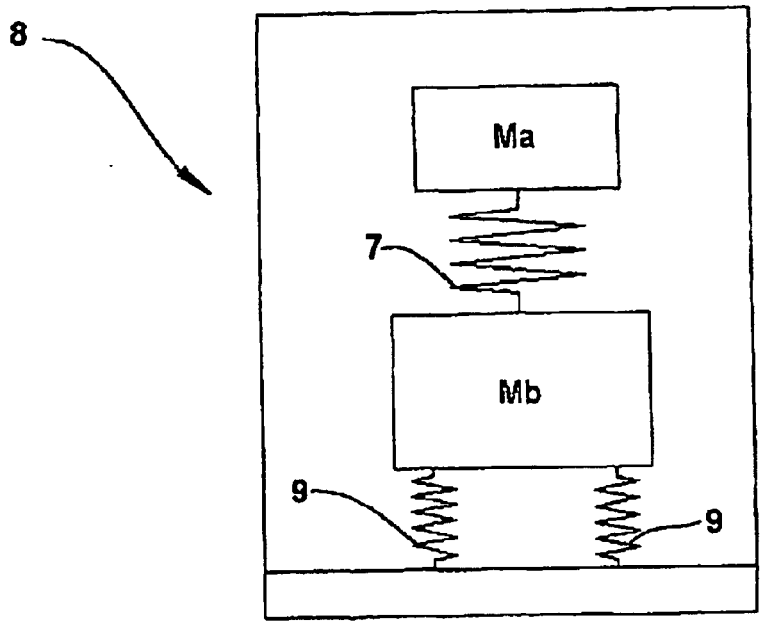
FIG. 2 is a schematic diagram of the compressor of FIG. 1 illustrating the masses and spring constants of the compressor elements and their interaction.
Figure 3:
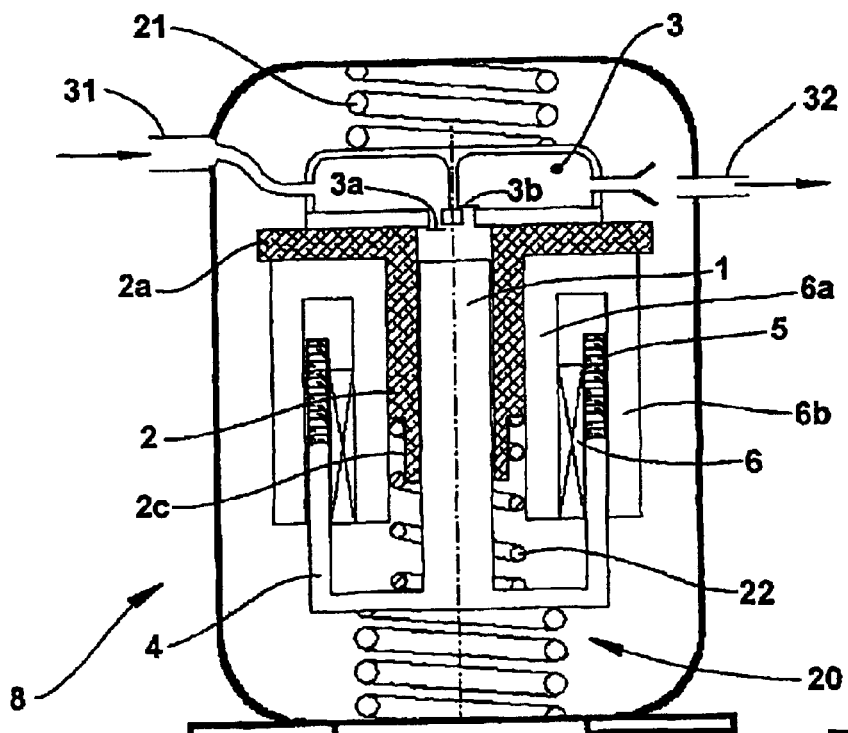
FIG. 3 is an elevational view in cross-section of a linear compressor made in accordance with a preferred embodiment of the invention.
Figure 4:
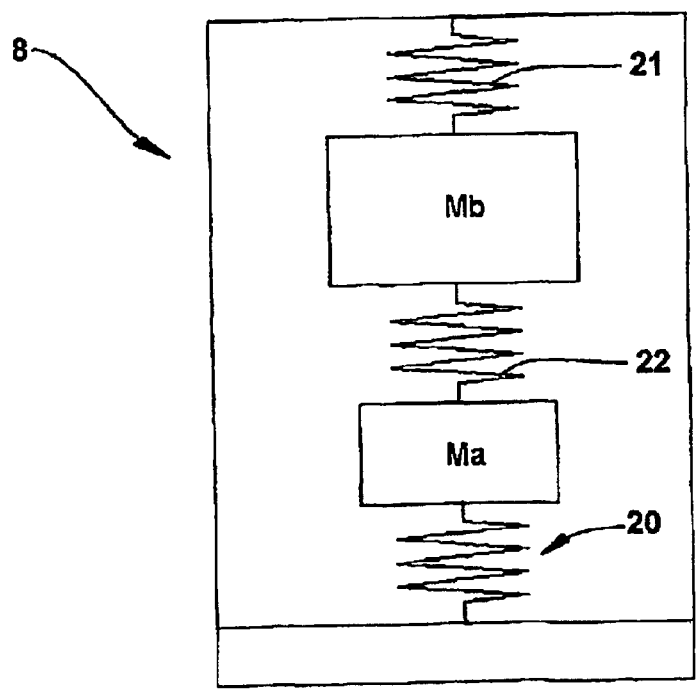
FIG. 4 is a schematic diagram of the compressor of FIG. 3 illustrating the masses and spring constants of the compressor elements and their interaction.

FIGS. 3 and 4 show a preferred embodiment of the compressor made in accordance with the invention, in which the same reference numbers are used for the same elements shown in FIGS. 1 and 2. The compressor of FIG. 3 differs from that of FIG. 1 in that the cylinder, in which the piston 1 slides, has an annular recess 2c at its lower end. In the illustrated embodiment, the annular recess 2c is defined by a respective section of reduced diameter at the lower end of the cylinder 2.

In FIG. 3, there is a first resilient element 20 that is mounted between the actuator 4 of the resonant assembly and the shell 8 of the compressor. The first resilient element 20 can be in the form of a helical spring of the necessary size having a desired spring constant Ka dimensioned according to the mass of the resonant assembly. This first resilient element 20 moves up and down as the piston 1 is reciprocated. There is further provided a second resilient element 21, which also can be a helical spring, mounted between the cylinder head 3 of the reference assembly and the shell 8 and having a spring constant Kb that is dimensioned as a function of the mass of the reference assembly. The second resilient element 21 also moves up and down as the piston reciprocates inside the cylinder. In general, the springs at both of the ends of the compressor are compressed and expanded simultaneously upon reciprocation of the piston.

Still according to the present solution, a third resilient element 22 is provided, which is also shown as a helical spring, having its upper end placed in the annular recess 2c at the lower end of the cylinder 2 of the reference assembly. The lower end of the third resilient element 22 overlies the lower end of piston 1 and rests on the interior of the actuator 4 of the resonant assembly. The third resilient element 22 has a desired spring constant Kc that defines a transition between the resonant and reference assemblies of the compressor and it is compressed as the piston 1 moves outwardly of the cylinder 2 and is expanded as the piston is moved in the cylinder to compress the gas.

FIG. 4 shows the compressor of FIG. 3 in schematic form, illustrating a mechanical resonant system formed by two masses Ma and Ma. The mass Ma includes the piston 1, the actuator 4, and the magnet member 5 of the resonant assembly. The mass Mb includes the cylinder 2, the cylinder block 2a, and the cylinder head 3 of the reference assembly. The three resilient elements 20, 21, 22, with the respective spring constants Ka, Kb and Kc, have a participation in the resonance frequency of the mechanical resonant system, that is, all three resilient elements 20, 21 and 22 move simultaneously as the piston reciprocates.

In the compressor of FIGS. 3 and 4, when the piston 1, as driven by the linear motor, moves down, the first resilient element 20 transmits a force, in the downward direction, to the shell 8, and the second resilient element 21 transmits a force, in the upward direction, to the shell 8. During the movements of the piston in opposite directions, the forces that are simultaneously produced by the first and the second resilient elements have their directions inverted.

In FIG. 4:

Ma=mass of the resonant assembly (elements 1, 4, 5)
Mb=mass of the reference assembly (elements 2, 2a, 2b, 3)
Ka=spring constant of the first resilient element 20 acting between the resonant assembly and the lower end of shell 8.
Kb=spring constant of the second resilient element 21 acting between the reference assembly and the upper end of shell 8.
Kc=spring constant of the third resilient element 22 acting between the resonant assembly and the reference assembly.

The compressor, with the mounting system of FIGS. 3 and 4, has a natural mechanical frequency and the first and second resilient elements 20 and 21 null out the forces applied to the shell 8, since they are simultaneously compressed and expanded by the respective masses Ma and Mb, in response to the displacement of the piston 1.

The object of the construction illustrated in FIGS. 3 and 4 is to balance the forces transmitted to the opposite ends of shell 8, in order to reduce and minimize vibration. To accomplish this, the relation Ma/Mb=Kb/Ka is determined between the masses and spring constants. The value of Kc for the third resilient element 22 is selected according to the particular design of the compressor elements, in order to operate as the resonant spring of the linear compressor.

For proper operation, with the compressor in a vertical orientation, the resilient elements 20, 21, 22 should have sufficient strength and stiffness for maintaining the compressor suspended inside the shell, taking into account the weight (mass) of the various compressor components.

The invention provides the advantage of distributing the forces transmitted to the shell in a more balanced manner. There is a possible disadvantage in the system resulting from an increased transmission of noise from the compressor to the shell, due to the larger resilient components. However, this can be solved with the provision of noise absorbing elements between the shell 8 and each of the first and second resilient elements 20, 21.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention as defined in the appended claims.

What is claimed is:

1. A linear compressor mounted inside a hermetic shell and including: a reference assembly formed of elements including a block defining a cylinder; a resonant assembly formed of elements including an actuator that carries a piston; and a linear electric motor including a magnet member and a coil for driving the actuator that reciprocates the piston within the cylinder, characterized in that it comprises: a first resilient element mounted between the resonant assembly and one end of the shell; a second resilient element mounted between the reference assembly and the other end of the shell; and a third resilient element mounted between the reference assembly and the resonant assembly, which resilient elements reduce the vibrations transmitted to the shell.

2. A linear compressor, as set forth in claim 1, characterized in that the elements of the resonant assembly have a mass, Ma, the elements of the reference assembly have a mass Mb, and said first and second resilient elements respectively have spring constants (Ka and Kb), which are dimensioned so that the relation Ma/Mb=Kb/Ka is obtained.

3. A linear compressor, as set forth claim 1, characterized in that said first, second and third resilient elements are each in the form of a helical spring.

4. A linear compressor, as set forth in claim 3, characterized in that the cylinder has an annular recess at its lower end, and the third resilient element has one end seated on said annular recess, while the other end is seated on the interior of the actuator.

5. A linear compressor, as set forth in claim 4, characterized in that the annular insert is defined by a respective section of reduced diameter at the lower end of the cylinder.

6. A linear compressor, as set forth in claim 2, characterized in that the third resilient element is defined by at least one flat spring that flexes in the direction of movement of the piston.

* * * * *

UNITED STATES PATENT AND TRADEMARK OFFICE
CERTIFICATE OF CORRECTION

PATENT NO. : 6,884,044 B2
DATED : April 26, 2005
INVENTOR(S) : Dietmar E. Lilie et al.

It is certified that error appears in the above-identified patent and that said Letters Patent is hereby corrected as shown below:

<u>Title page,</u>
Item [73], Assignee, delete "Empresa Brasileira de Compressores S.A.-Embraco" and substitute -- Empresa Brasileira de Compressores S.A.-Embraco, Joinville-SC, Brazil --.

Signed and Sealed this

Twenty-eighth Day of February, 2006

JON W. DUDAS
*Director of the United States Patent and Trademark Office*